Jan. 2, 1934.  L. W. BLACKWOOD  1,942,018
RESILIENT WHEEL
Filed Jan. 30, 1933
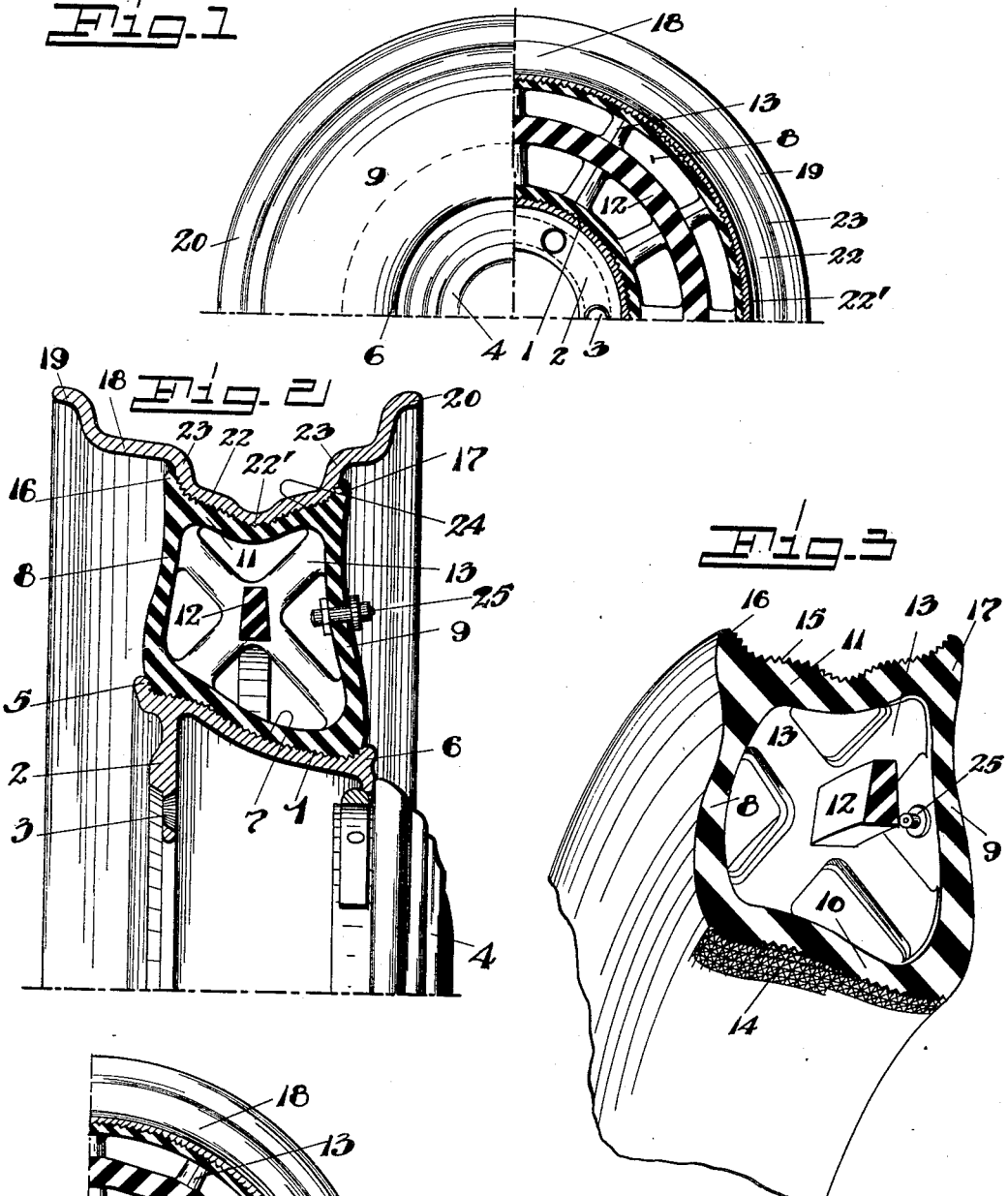
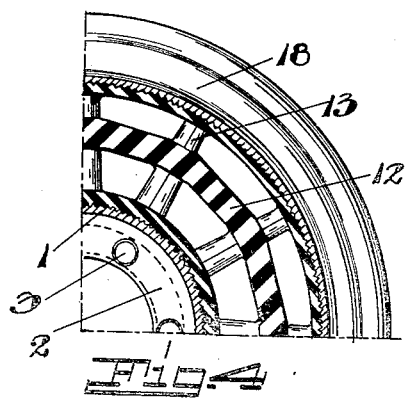
Inventor
LLOYD W. BLACKWOOD
By Herbert E. Smith
Attorney Patented Jan. 2, 1934

1,942,018

UNITED STATES PATENT OFFICE 1,942,018

RESILIENT WHEEL

Lloyd W. Blackwood, Spokane, Wash.

Application January 30, 1933. Serial No. 654,272

1 Claim. (Cl. 152—28)

My present invention relates to an improved resilient wheel of the type embodying an inflatable annular tube, located intermediate the hub or the hub ring, and the metallic rim on which the usual pneumatic tire is mounted. The primary object of my invention is to provide a wheel of this type for automotive vehicles which is simple in construction and composed of a minimum number of parts thereby insuring facility in assembling its parts and in making repairs or changes in the wheel. The wheel constructed according to my invention is strong and durable, and at the same time possesses the characteristic of resiliency or flexibility by means of which initial strains, occasioned by the starting movement of the vehicle as well as the braking action, are absorbed to insure smooth starting and stopping of the vehicle. By the utilization of the structure of my invention in the vehicle wheel, the wheels are insulated against transmission of sound or rumbling noises as well as against transmission of many vibrations generated at the wheels of the traveling vehicle and which would otherwise cause discomfort to the passenger of a traveling car or automotive vehicle.

The invention consists in certain novel features of construction and combinations and arrangements of parts in the wheel structure as will hereinafter be more fully set forth and claimed.

In the accompanying drawing I have illustrated one complete example of the physical embodiment of my invention wherein the parts are combined and arranged according to the best mode I have thus far devised for the practical application of the principles of my invention, but it will be understood that changes and alterations may be made in the exemplified structure, within the scope of my claim, without departing from the principles of my invention.

Figure 1 is a view showing the upper half of a wheel in which my invention is embodied, the right half of the figure being in section for convenience of illustration.

Figure 2 is an enlarged detail sectional view showing the metal hub-ring, the intermediate annular, inflatable tube, and the metal rim of the wheel.

Figure 3 is an enlarged vertical sectional view, partly in perspective, showing part of the inflatable, intermediate, annular tube.

Figure 4 is a sectional view of one quarter of the wheel.

In the preferred form of my invention as exemplified in the drawing I employ a hub-ring 1 of metal, at the center of the wheel, and this hub-ring is fixed to the usual axle-drum by means of the attaching flange on the hub-ring, designated 2, and the attaching bolts 3, and a well known type of hub-cap 4 is used with the wheel.

On its exterior periphery the metal hub-ring is fashioned with an inner annular flange 5 and an outer annular flange 6, which are employed as retaining flanges for the intermediate inflatable tube. As best seen in Figure 2 the hub-ring is of frusto-conical shape, or in the shape of a truncated cone, with its smaller diameter at the outer side of the wheel to facilitate assembling of the parts of the wheel, and the circumferential wall of the hub-ring is of concavo-convex shape with a roughened or corrugated exterior face, to form a seat for the intermediate tube, and to increase the frictional engagement of the tube with the hub-ring thereby preventing relative movement between the hub-ring and the tube.

The inflatable tube is fashioned in manner similar to the construction of pneumatic tires, preferably of reinforced rubber, including fabric or cords, and the tube is preferably, approximately, rectangular in cross section, with the inner and outer walls 8 and 9 respectively for the sides, and the inner and outer walls 10 and 11 respectively for the peripheral members of the tube.

Within the tube is arranged an integral, annular reinforcing ring 12, located approximately at the center of the tube within the side walls 8 and 9 and the inner and outer walls 10 and 11, and this ring is integrally joined to the walls of the tube by means of radially disposed diagonally extending or X-shaped braces 13, which are spaced at intervals within the interior of the tube and interrupt or intersect the reinforcing ring 12. In this manner the interior of the tube is reinforced by the cross braces and the reinforcing ring, to maintain the correct structural shape of the tube when it is deflated, and also to maintain the tube in proper shape, so that when inflated, the tube will be braced both laterally and circumferentially, against strains imposed on the wheel while in service.

As indicated in Figure 3 the face of the inner wall 10 of the tube is roughened, corrugated, or indented as shown at 14, and these corrugations or indentations co-act with the complementary friction-creating elements or members 7 on the exterior face of the hub-ring 1, to prevent relative circumferential movement between the hub ring and the tube. With the tube inflated, as in Figure 2, the inner wall 10 of the tube is retained against lateral movement by the complementary retaining flanges 5 and 6 of the hub ring, and as the complementary friction members 14 and 7 co-act to prevent relative movement of the hub ring and tube, it will be evident that the hub-ring provides an effective seat or bearing base for the tube.

The outer wall 11 of the tube, on its outer face, is also provided with corrugations or indentations as 15, and this wall, as seen in Figures 2 and 3 is fashioned with an inner flange 16 and an outer flange 17 projecting outwardly from the body of the tube.

The metal rim 18, which surrounds the inflatable tube, is fashioned with retaining flanges 19 and 20 that co-operate with a pneumatic tire (not shown) to form a clincher type of joint or fastening to assist in securing the tire on the rim, which tire of course is inflated and retained under tension on the rim.

The annular metallic rim, as seen in Figure 2 is fashioned with an annular depression 22 forming an inner bead 22', and the side walls 23, 23 of this depression receive the beads of the tire.

The inner face of this annular depression is roughened, corrugated, or indented as at 24 complementary to the corrugations or indentations 15 on the exterior periphery of the tube, and these parts co-act to prevent relative circumferential movement of the tube and the rim.

The depressed portion 22 of the rim is substantially the width of the outer portion of the tube, between the two retaining flanges 16 and 17 of the tube, and the inner wall 10 of the tube is wider than the outer wall 11, in order that the inner wall, which is retained between the flanges 5 and 6 may provide a wide bearing base on the hub ring for the tube.

The depressed portion 22 and the annular rib 22' of the rim, in co-operation with the outer wall 11 and flanges 16 17 of the tube, prevent any possibility of wobbling on the part of the rim and the tire mounted thereon.

The tube is provided with a usual type of inflating valve 25, and it will be apparent that the deflated tube may with facility be mounted on the hub ring and adjusted in proper position, after which the tube is partially inflated for the purpose of securing the tube in position on the hub ring. Then the rim is mounted on the exterior periphery of the tube, and the latter is filled with compressed air, or inflated in usual manner by attaching a filling hose to the valve 25. The inflatable tube is thus expanded to the proper shape and position between the hub ring and the surrounding rim, and because of the formations at the joints between the hub ring and the tube and the tube and the rim, the three parts are securely locked or fastened together against relative displacement.

The X-braces 13, and the reinforcing ring 12 which performs the function of a series of arches or arcuate braces, it will be understood, while providing sufficient rigidity to the tube to prevent total collapse thereof when the tube is deflated, are yet resilient. Therefore, while the tube is being inflated, the resiliency or elasticity of these cross braces and arcuate braces permits the tube to automatically adjust itself in its proper symmetrical position between the hub ring and the rim, and of course the braces within the tube prevent excessive deformation of the tube while in service.

As indicated at the left in Figure 1, the wheel constructed according to my invention presents the appearance of a disc wheel, but the performance of its function as a sound insulator by the intermediate tube, eliminates any rumbling noise that usually accompanies the disc wheel made wholly of metal.

In demounting the tire and rim, the reverse of the mounting operation is performed, by deflating the tube sufficiently to permit its deformation so that the rim may be dismounted at the outer side of the wheel.

Having thus fully described my invention, what I claim as new and desire to secure by Letters Patent is:—

The combination in a resilient wheel with a hub ring having inner and outer retaining flanges, of an inflatable tube mounted on the hub ring between said flanges, a metal rim on the tube, spaced annular retaining flanges on the tube engaging the rim, said rim having an annular depressed portion between the retaining flanges, a series of circumferentially spaced X-braces within the tube, an annular series of arcuate braces between said X-braces, and the cross-legs of said X-braces extending diagonally, between a hub-ring flange and a tube flange, to opposite sides of the arcuate braces.

LLOYD W. BLACKWOOD.